United States Patent [19]

Allegre et al.

[11] 4,329,609
[45] May 11, 1982

[54] ROTOR WITH A DAMPER SCREEN FOR AN ALTERNATOR WITH PROJECTING POLES

[75] Inventors: Jean Allegre, Belfort; Gilbert Mérouge, Bavilliers; Gilbert Ruelle, Belfort, all of France

[73] Assignee: Alsthom Atlantique, Paris, France

[21] Appl. No.: 163,235

[22] Filed: Jun. 25, 1980

[30] Foreign Application Priority Data

Jul. 19, 1979 [FR] France ................ 79 18711

[51] Int. Cl.³ .............................................. H02K 1/10
[52] U.S. Cl. ...................................... 310/183; 310/216
[58] Field of Search ............... 310/182, 183, 269, 211, 310/60 A, 184, 216, 218

[56] References Cited

U.S. PATENT DOCUMENTS

| | | | |
|---|---|---|---|
| 626,172 | 5/1899 | Lamme | 310/183 |
| 1,030,041 | 6/1912 | Williamson | 310/183 |
| 1,208,460 | 12/1916 | Bisbee et al. | 310/183 |
| 2,752,518 | 6/1956 | Ringland | 310/183 |
| 3,106,654 | 10/1963 | Wesolowski | 310/183 X |
| 3,562,568 | 2/1971 | Susdorf et al. | 310/182 X |
| 4,028,574 | 6/1977 | Canay | 310/183 X |

*Primary Examiner*—Donovan F. Duggan
*Attorney, Agent, or Firm*—Sughrue, Mion, Zinn, Macpeak & Seas

[57] ABSTRACT

The invention relates to a rotor with a damper for an alternator with projecting poles. The squirrel cage type screen damper, includes not only conventional polar bars (10) sunk in projecting pole pieces (6a, 6b), but also interpolar bars (22) having wings (26) arranged between consecutive projecting pole pieces and ensuring damping of the components of the variable magnetic flux which are of large space pitch. Application to the production of electric power, in particular by submerged hydro-electric bulb units.

4 Claims, 3 Drawing Figures

ROTOR WITH A DAMPER SCREEN FOR AN ALTERNATOR WITH PROJECTING POLES

FIELD OF THE INVENTION

The present invention relates to a rotor with a damper screen for an alternator with projecting poles.

BACKGROUND OF THE INVENTION

Such a rotor includes:
a longitudinal rotation axis;
a magnetic circuit which forms poles which project radially outwardly, extend longitudinally and are spaced out angularly about the axis, each pole including a polar core and ending near the outside in a projecting pole piece whose edges project angularly on either side of the polar cores;
exciter windings between the polar cores;
damper bars made of a substance which is a good conductor of electricity and extending longitudinally without discontinuity along the whole length of the poles, some of these bars being interpolar damper bars disposed between the poles; and
two conductor rings disposed coaxially with the rotor at respective ends thereof and electrically connected to respective ends of each damper bar to form a damper screen of the squirrel cage type with these bars. It is applicable advantageously to low-speed alternators, e.g. in a submerged hydro-electric turbo-alternator of the bulb type, herein called, for short, a bulb unit.

Such a unit provides electric power at at least 5 MVA, e.g. 40 MVA. It is located in a bulb i.e. in a sealed profiled chamber with a generally horizontal axis, said bulb itself being disposed in the axis of a water duct. It includes a turbine whose moving blades intercept the liquid flow which flows past the bulb on all sides thereby driving the rotor of an alternator disposed inside the bulb.

The water duct, the bulb, the turbine and the alternator are aligned along the same axis.

The magnetic circuit of an alternator's stator or, in short, the stator magnetic circuit is constituted by a ring whose radially internal portion has grooves which contain the bars of the stator winding. The diameter of said circuit is always limited, in particular, in the case of a bulb unit, by the maximum diameter which can be allowed for the bulb which contains it, it being generally impossible to allocate a diameter of more than 5 to 6 meters to the space occupied by the rotor.

The mechanically strong part of the ring of the stator magnetic circuit which is confined to the zone where the grooves are not cut is therefore radially relatively thin and therefore it is comparatively much less rigid than in a conventional alternator. Since the rotation speed of the bulbs is low (e.g. less than 100 or 120 r.p.m.) these alternators have a large number of poles which being installed on a limited diameter, are spaced around the periphery at a relatively small polar pitch (e.g. 20 to 30 cm).

To obtain a voltage whose waveform is substantially sinusoidal at the terminals of the machine, the winding of the armature must have a non-integer number of grooves per pole and per phase. Such a winding is very rich in space harmonics due to armature reaction, in particular in sub-harmonics whose space period extends over several pairs of poles.

Further, the small diameter of the units leads to very much smaller air gaps being adopted than with conventional machines so as to be able to maintain acceptable induction in the air gap without increasing the excitation current too much, taking into account the small polar pitch of these machines. The result of this is that the notch harmonics are greater in low-speed machines such as bulb machines than in larger hydroelectric alternators.

In these conditions, due to the fact that when the stator magnetic circuit is thin and therefore does not withstand radial bending to any great extent, there is a high risk of vibration due to the effect of the notch harmonics or of the numerous armature reaction harmonics.

In this respect, it should be noted that the space pitch and the rotation speed of each armature reaction harmonic are very different from one another with respect to the rotor. The frequency of the notch harmonics with respect to the rotor is high (8 to 12 times the power-line frequency) and its space pitch may extend over several poles.

From the above, it ensues that when it is sought to obtain high electric power at the output of a low-speed alternator, the vibrations of the ring of the stator magnetic circuit may reach a detrimental level. It is known that in conventional alternators, the forces of electromagnetic origin to which said ring is subjected can be limited by installing a damping winding disposed at the periphery of the rotor. Said winding is generally of the squirrel cage type and is constituted by longitudinal conductor bars, i.e. bars parallel to the axis and connecting two conductor rings disposed at respective ends of the rotor. Some of these bars are polar bars, i.e. they are sunk in the outer zone of the projecting pole pieces. Others may be interpolar bars, i.e. they may be disposed between the poles. For example, an interpolar bar 15 is shown in FIG. 5 of French Pat. No. 1 475 482 (Moskovsky Energetichesky Institut).

The effect of centrifugal forces on such known bars is countered by auxiliary means, e.g. resin interposed between the interpolar bar and the air gap of the alternator, thereby reducing the efficiency of the damping means.

In particular, it ensues from the above that known dispositions do not allow the winding to damp efficiently those high-frequency harmonics with large space pitches that are encountered in low-speed alternators with narrow air gaps, and this may cause the vibration level to be too high.

Preferred embodiments of the present invention provide a rotor with a damping screen for an alternator with projecting poles having interpolar damping bars to allow high-frequency flux harmonics with large space pitches to be damped in a particularly efficient way.

SUMMARY OF THE INVENTION

The invention provides a rotor with a damper screen for an alternator with projecting poles. The rotor includes:
a longitudinal rotation axis;
a magnetic circuit which forms poles which project radially outwardly, extend longitudinally and are spaced out angularly about the axis, each pole including a polar core and ending near the outside in a projecting pole piece whose edges project angularly on either side of the polar cores;
exciter windings between the polar cores;

damper bars made of a substance which is a good conductor of electricity and extending longitudinally without discontinuity along the whole length of the poles, some of these bars being interpolar damper bars disposed between the poles; and two conductor rings disposed coaxially with the rotor at respective ends thereof and electrically connected to respective ends of each damper bar to form a damper screen of the squirrel cage type with these bars.

The improvement includes the interpolar bars of said rotor including:

shoes which press against the inside surfaces of the edges of the projecting pole pieces; and wings integral with the shoes and extending over more than half the radial gap occupied by the neighbouring projecting pole pieces.

The above disposition allows effective damping of harmonics having very different space pitches, since the positions of the interpolar bars not only allow them to have an effect on a part of the magnetic flux on which conventional damping screens have no effect, but also allows bars to be provided which have as large a cross-section as may be necessary to reduce their electrical resistance to an acceptable value, which may be lower than that of conventional bars (polar bars).

These interpolar bars hold themselves in position despite centrifugal force by bearing on the edges of the projecting pole pieces of the two adjacent poles; therefore, they require no support parts and can therefore be disposed in the immediate neighbourhood of the air gaps. (Some parts of the damping means may also be located in the air gaps).

This makes it possible, in particular, to obtain a reduced skin effect and therefore to intercept high-frequency harmonics.

It should be noted that said interpolar damping screen which is usually associated with the conventional polar damping screen can be substituted for said conventional screen since the rotor then has only one damping cage constituted in accordance with the invention.

With reference to the accompanying schematic figures, it will be explained hereinafter by way of a non-limiting example how the invention can be put into effect. When the same component is illustrated in several figures, it bears the same reference symbol in all of them.

DESCRIPTION OF THE PREFERRED EMBODIMENTS

Figure 1:
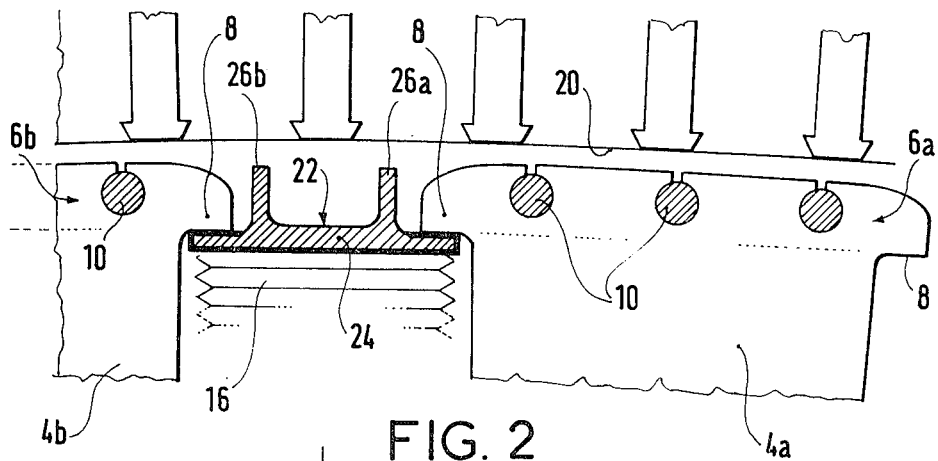
FIG. 1 is a partial view of a rotor in accordance with a first embodiment of the invention, showing a cross-section through a plane perpendicular to the axis of the rotor.
Figure 2:
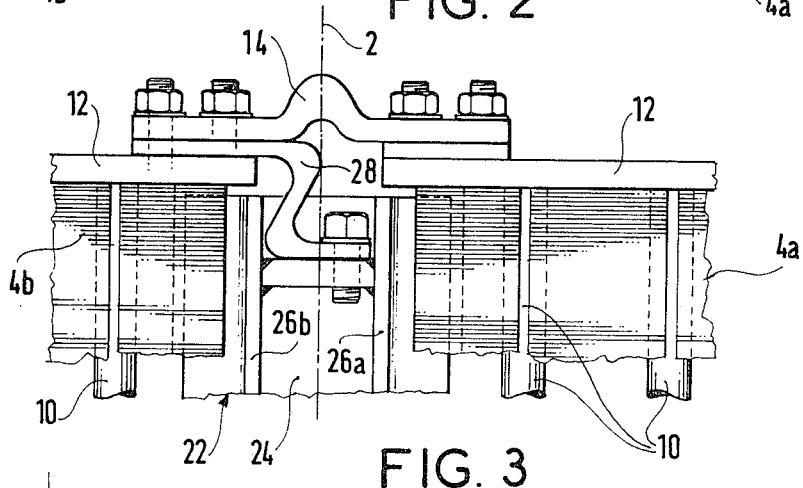
FIG. 2 is a plan view, from above, of one end of the rotor shown in FIG. 1, the plane of the figure being parallel to the axis of the rotor.

A rotor in accordance with the invention rotates about an axis 2 (not shown in FIG. 1 but only in FIG. 2) where it is in line with the longitudinal axis of an interpolar gap. The word "longitudinal" designates here the directions parallel to said axis and the word "radial" designates the directions which meet at said axis at right angles, and the word "angular" and "circumferential" designating the movements resulting from the rotation about said axis. The figures show only two consecutive projecting poles which form a part of the magnetic circuit of the rotor. The cores of said poles are shown at 4a and 4b and their projecting pole pieces are shown at 6a and 6b. These projecting pole pieces have edges 8 which project circumferentially with respect to the cores.

Conventional damper winding bars 10, here called "polar" winding bars, are made of copper and are disposed in said projecting pole pieces. Their ends are connected to conducting rings which are coaxial with the rotor and are intended to form a damper screen of the squirrel cage type. The rings are constituted by polar segments 12 connected to one another by flexible connectors 14 constituted by copper bands. The slots formed by the gaps between the polar cores are occupied by exciter windings 16. Said rotor rotates in a stator 20.

In accordance with a first embodiment of the invention, an interpolar bar 22 made of a metal which is a good non-magnetic conductor (copper, aluminium) is disposed in each gap between the poles of the rotor. Said bar has a shoe 24 which presses against the inner faces of the edges 8 and which is partially insulated to prevent any electrical contact with the poles or with the exciter winding. Said shoe can act as a groove packing piece i.e. as a part for holding the windings in the grooves. The interpolar bar further includes two wings 26a and 26b which project radially outwardly from the shoe and are disposed (depending on the embodiment) either in contact with or near the projecting pole pieces 6a and 6b respectively, so that in either case the distance between the two wings is greater than that between the wings and the projecting pole pieces. These wings extend radially as far as the projecting pole pieces or at least as far as the middle of the radial extent thereof. The shoe may possibly be made of a non-magnetic substance which is mechanically stronger than that of the wings and not such a good conductor of electricity.

The wings can easily be made to extend radially as far as necessary. For example, although not thus illustrated, they can occupy the entire radial extent of the projecting pole pieces and even in some cases, they may extend radially beyond these projecting pole pieces and then extend into the air gap.

A flexible connector 28 connects both ends of each interpolar bar to the conductive rings formed by the segments 12 and the connectors 14.

Other connection means are evidently possible, e.g. connections through the iron of the polar cores which is laminated so as to present high electric resistance only to longitudinal currents.

Figure 3:
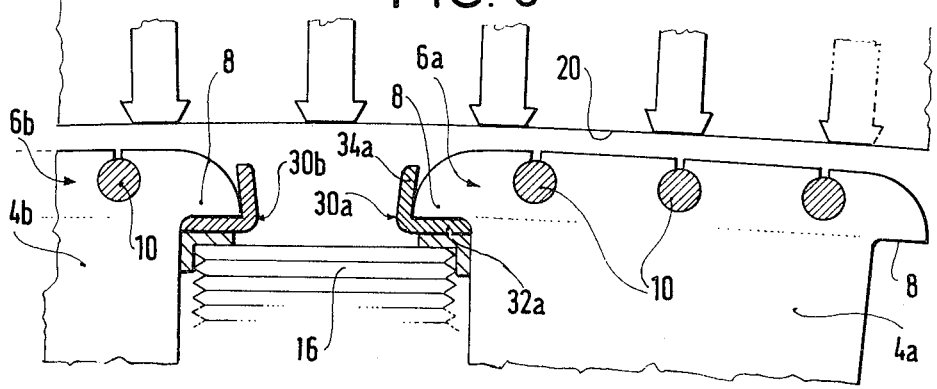
FIG. 3 is a partial view of a rotor in accordance with a second embodiment of the invention, showing a cross-section through a plane perpendicular to the axis of said rotor.

In a second embodiment of the invention shown in FIG. 3 and which is analogous to the first, there are two symmetrical interpolar bars 30a and 30b in the form of angle bars in each gap between the poles. Each bar has a shoe such as 32a bonded to the inner surface of the edge 8 of one of the projecting pole pieces and a wing such as 34a which projects outwardly along said edge. A distinct groove packing piece 36 is then necessary to support the winding 16.

The wings may be 4 mm thick, for example, and the shoes may also be 4 mm thick, for example, for a bulb unit whose rotor rotates at 75 r.p.m. and has a diameter of 5.058 mm and 80 poles with a free space of 54 mm between the edges of two neighbouring projecting pole pieces.

We claim:

1. A rotor for an alternator with a damper screen, said rotor including:

a longitudinal rotation axis;

a magnetic circuit including poles which project radially outwardly, extend longitudinally and are spaced out angularly about the rotation axis, each pole including a polar core and ending radially outwardly in a projecting pole piece whose edges project angularly on either side of the polar core;

exciter windings positioned between the polar cores;

damper bars formed of a good electrical conductor and extending longitudinally without discontinuity along the whole length of the poles including polar damper bars extending through the poles and interpolar damper bars disposed between the poles; and two conductor rings disposed coaxially with the rotor at respective ends thereof and electrically connected to respective ends of each damper bar to form with these bars a damper screen of the squirrel cage type;

the improvement wherein the interpolar bars of said rotor extend longitudinally the length of said poles and each includes:

a shoe which presses against the inside surface of the edge of at least one of the projecting pole pieces, over the longitudinal length thereof; and at least one wing integral with the shoe and extending over more than half the radial gap occupied by the neighbouring projecting pole pieces and throughout the longitudinal extent thereof and located adjacent the end of said at least one projecting pole piece edge.

2. A rotor according to claim 1, wherein a single interpolar bar in each group lies between two neighbouring poles, said interpolar bar having a shoe which presses against the inside surface of the edges of laterally opposing projecting pole pieces of these two neighbouring poles and wherein said at least one wing forms a radial outward projection on said shoe.

3. A rotor according to claim 2, wherein each interpolar bar includes two such wings near respective opposed projecting pole pieces, the distance between the two wings being greater than the distance between each wing and the neighbouring projecting pole piece.

4. A rotor according to claim 1, wherein said rotor includes two interpolar bars in each gap between two consecutive poles, said interpolar bars each extending along one circumferential side of said gap and having a cross-section in the form of an angle bar having two flanges, one of whose flanges is a shoe fixed on the inner surface of the edge nearest the projecting pole piece, and the other flange of the angle bar being a wing which forms a radially inwardly projecting part on said shoe in the gap between the projecting pole pieces.

* * * * *